UNITED STATES PATENT OFFICE 2,063,868

AMINO DERIVATIVES OF AROMATIC KETONES AND METHOD OF MAKING SAME

Edgar C. Britton and Lyman Heindel, Midland, Mich., and Fred Bryner, Yreka, Calif., assignors to The Dow Chemical Company, Midland, Mich., a corporation of Michigan No Drawing. Application November 30, 1932, Serial No. 645,038

18 Claims. (Cl. 260—128)

The present invention concerns a method of making certain new compounds having the general formula

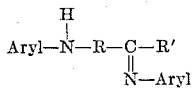

wherein R represents an aromatic residue and R' represents an alkyl, aryl, or aralkyl group. The invention further concerns the new compounds made by such method.

In a co-pending application of E. C. Britton and F. Bryner, serial No. 604,348, filed April 9, 1932, and issued December 9, 1933 as U. S. Patent No. 1,938,890, it is shown that a halogenated aromatic ketone, bearing a halogen substituent in an aromatic nucleus thereof, may be reacted with substantially its molecular equivalent of an alkali metal, or calcium salt of a primary amine to form the corresponding imide of the halogenated ketone. When a metal salt of a primary aromatic amine is employed as a reactant the reaction involved is represented by the equation

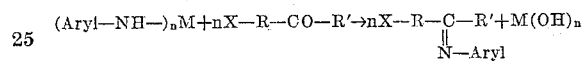

In the above formula, and also in those following, R represents an aromatic residue, R' represents an alkyl, aryl, or aralkyl residue, M represents an alkali metal, calcium, or magnesium, X represents halogen, and $n$ is the integer 1 or 2.

We have now found that such imide of a halogenated aromatic ketone can be further reacted with an arylamine salt, having the general formula

to form the corresponding arylamino derivative of the ketone-imide. The reaction involved is represented by the equation

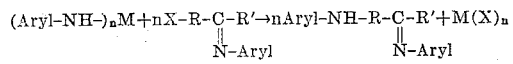

Many of our new arylamino-ketone-imide products, which may be obtained by carrying out reactions of the type just described, are excellent rubber antioxidants.

To the accomplishment of the foregoing and related ends, the present invention, then, consists of the method and new compounds hereinafter fully described and particularly pointed out in the claims, the following description and the examples setting forth in detail several modes of carrying out the invention, such disclosed modes illustrating, however, but several of the various ways in which the principle of our invention may be used.

An alkali metal, calcium, or magnesium salt of a primary aromatic amine which is to be employed as a reactant in our method, may itself be formed through heating and stirring (with or without superatmospheric pressure) an alkali metal, e. g. sodium or potassium, calcium, or magnesium, under atmospheric or superatmospheric pressure, with an excess of a primary aromatic amine in the presence of cuprous oxide as a catalyst. The reaction is preferably carried out in the presence of an inert atmosphere, e. g. hydrogen, nitrogen, the vaporized amine itself, etc. If an alkali metal salt is to be formed, it is preferable that the reacting mixture be maintained at a temperature above the melting point of the alkali metal, so as to assure good contact between the metal and the amine and thereby shorten the time of reaction. When a calcium or magnesium salt of a primary aromatic amine is to be formed, the reacting mixture is preferably maintained at a temperature sufficiently high to cause fairly rapid reaction. Due to the high melting points of calcium and magnesium, said metals must be reacted in solid state, so that the reaction cannot be carried out as rapidly as in the case of the alkali metal salt. We prefer, therefore, to employ an alkali metal salt of a primary aromatic amine as a reactant in forming compounds of our new class. The description, then, is directed particularly to a method employing alkali metal salts of primary aromatic amines as reactants, but it will be understood that the corresponding calcium or magnesium salts may be employed instead.

In preparing an imide of a halogenated aromatic ketone, an alkali metal salt of a primary aromatic amine may be diluted with an inert solvent, e. g. toluene, xylene, a saturated higher aliphatic hydrocarbon, an excess of the free amine itself, etc., if desired, so as to obtain a relatively thin mixture or solution thereof. To this mixture a desired halogenated aromatic ketone is added, with stirring, in amount representing approximately the molecular equivalent of the alkali metal salt present. The reaction is most conveniently carried out at a temperature between 50° and 200° C., although any temperature between 0° C. and the decomposition point of the reacting materials may be used. If the reacting mixture is maintained at a temperature below 50° C., the reaction proceeds slowly, though smoothly. The maintenance of a reaction temperature above 200° C. is unnecessary and may result in the formation of a mixture of products rather than substantially a single product. The reaction may be carried out under either atmospheric or superatmospheric pressure, but in either instance it is preferable that it be in the presence of a substantially inert atmosphere, e. g. hydrogen, nitrogen, saturated hydrocarbon vapors, etc. Ordinarily the reaction is substantially completed after heating the mixture to a temperature between 50° and 200° C. for one hour, but longer heating may sometimes be required.

If desired, the intermediate halogen-bearing imide product from the above reaction may be isolated through procedure similar to that described in the co-pending application of E. C. Britton and F. Bryner, Serial No. 604,348, filed April 9, 1932, and issued December 12, 1933 as United States Patent No. 1,938,890, but ordinarily a complete separation of such intermediate product is not necessary.

If the primary aromatic amine whose salt is to be reacted with the halogenated ketone-imide is not identical with the amine whose salt was employed as a reactant in forming said ketone-imide, it is preferable that all unreacted amine and amine salts first be separated from the intermediate halogenated ketone-imide in order to avoid the possible formation of a mixture of arylamino-ketone-imide products rather than substantially a single product. On the other hand, if the amine whose salt is to be reacted with the halogenated ketone-imide is identical with the amine whose salt was employed in forming said halogenated ketone-imide, separation of the latter from unreacted amine becomes both unnecessary and undesirable as the free amine serves as an excellent medium in which to carry out the second reaction. In fact, when a metal salt of a single primary aromatic amine is to be employed as a reactant in introducing both the imido and amino group into the arylamino-ketone-imide product, the two reactions required to form such product may be carried out in a single step, the halogenated aromatic ketone being reacted directly with about twice its molecular equivalent of a metal salt of the desired amine.

In forming an arylamino-ketone-imide, either the crude or purified halogenated aromatic ketone-imide may be partially or completely dissolved in a substantially inert solvent, e. g. toluene, xylene, an excess of the amine corresponding to the amine salt with which the imide is to be reacted, etc. The resultant mixture is gradually added with stirring to a mixture or solution containing approximately its molecular equivalent of a metal salt of the desired aromatic amine in a substantially inert solvent and the reaction mixture is maintained at a temperature preferably between 50° and 200° C. during such addition. Stirring and heating are continued until the reaction is substantially completed. Ordinarily, about one hour is required to effect substantially complete reaction.

As procedure alternative to that described above, a mono-halo-aromatic ketone which bears the halogen substituent in an aromatic nucleus thereof may gradually be added, with stirring, to a mixture containing about twice its molecular equivalent of a metal salt of a primary aromatic amine and toward the end of reaction, the mixture may be heated to a temperature preferably between 180° and 250° C. until reaction is substantially complete. Thereby, an arylamino-ketone-imide is formed through a single operation.

If the arylamino-ketone-imide product formed through either of the modes of operation described above is one derived from a halogenated diaryl ketone, such product may be isolated through extracting the crude reaction mixture with water to remove inorganic salts therefrom, drying the organic mixture, and distilling solvents and unreacted organic intermediates from the arylamino-ketone-imide product.

If the arylamino-ketone-imide product is one derived either from a halogenated aryl-alkyl or aryl-aralkyl ketone, said product may be unstable in the presence of hydrolyzing agents. In separating such arylamino-ketone-imide from a reaction mixture, we find it convenient to dilute said mixture with sufficient organic solvent, e. g. petroleum ether, benzene, toluene, chlorobenzene, etc., to form a relatively thin mixture or solution thereof, and then to neutralize any inorganic hydroxide which may be present with a substantially anhydrous and preferably weak acid, e. g. acetic acid, oxalic acid, benzoic acid, ammonium chloride, etc. The mixture is then filtered to separate metal salts therefrom and all solvents and or-organic impurities are distilled from the arylamino-ketone-imide product. In some cases such product may itself be distilled under subatmospheric pressure, but the majority of such products have high boiling points and tend to decompose during distillation.

Our new arylamino-ketone-imide compounds all have the general formula

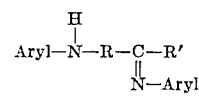

wherein R represents an aromatic residue and R′ represents an alkyl, aryl, or aralkyl residue. Such compounds cannot readily be crystallized and ordinarily are obtained as glass-like solids which, though apparently non-crystalline, have quite definite fusion points and may be ground and handled in the powdered form.

The following table describes a number of arylamino-ketone-imides prepared according to our method and sets forth the yield of each such product obtained. In each instance except that of 4-anilino-benzophenone-anil, the yield of product stated is based upon the quantity of sodium arylamine salt reacted in forming such product. The yield of 4-anilino-benzophenone-anil stated in the table is based on the quantity of sodium anilide employed in the reaction.

The following general procedure was employed in preparing the compounds described in the table. A mixture of approximately 2.5 mols of an arylamine and 0.3 grams of cuprous oxide was placed in a flask fitted with a mechanical stirrer, a reflux condenser, and an inlet for hydrogen. The mixture was stirred and heated to a temperature between 100° and 230° C., hydrogen was passed through the flask, and 23 grams (1.0 mol.) of sodium was added in small portions to the stirred mixture. After the sodium was completely reacted, 108.3 grams (0.5 mol.) of 4-chloro-benzophenone was gradually added to the stirred mixture. Stirring was continued and the mixture was heated to a temperature between 170° and 230° C. for a period of from 1 to 5 hours. The mixture was then cooled to about 70° C., diluted with benzene, then extracted with water to remove metal salts therefrom. All solvent and lower boiling organic compounds were then distilled from the desired arylamino-ketone-imide product.

Table

| 4-chloro-benzo-phenone reacted with sodium salt of— | Probable formula of product | Percent yield of product | Color of product | Fusion point °C. | B. P. °C. 23 mm. |
|---|---|---|---|---|---|
| Aniline | 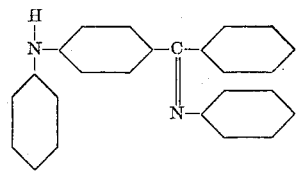 | 93 | Grayish-brown. | 56 | -------- |
| Alpha-naphthyl-amine. | 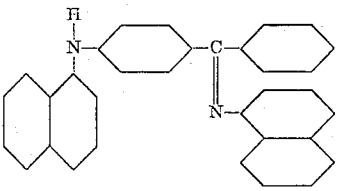 | 98.8 | Olive | 88-91 | -------- |
| Beta-naphthyl-amine. | 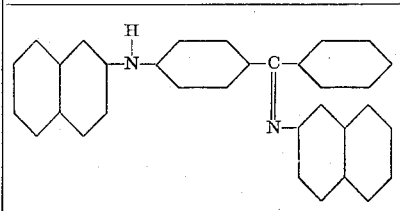 | 94.5 | Yellowish green. | 108-109 | -------- |
| 4-amino-diphenyl | 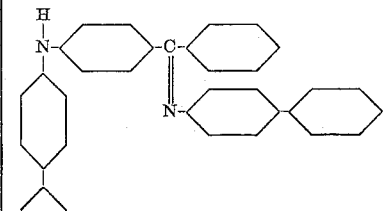 | 96.6 | Yellowish olive. | 64-66 | -------- |
| Para-toluidine | 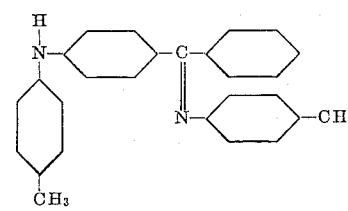 | 100.0 | Yellowish olive. | 62-64 | -------- |
| Phenetidine | 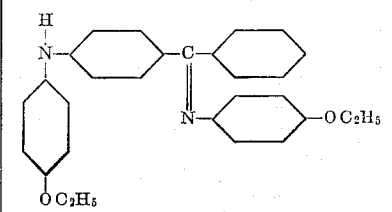 | 51.2 | Yellowish brown. | -------- | 273 |

In addition to the compounds described in the foregoing table, we have prepared other compounds of our new class according to the procedure described by the following examples.

Example 1

In a flask provided with a mechanical stirrer, thermometer, reflux condenser, and an inlet for hydrogen were placed 179 grams (1.25 mols) of alpha-naphthylamine, 11.5 grams (0.5 mol.) of sodium, and 0.2 gram of cuprous oxide. The mixture was heated to 225°–230° C. and stirred continuously until all of the sodium was dissolved. The mixture was then cooled to about 105° C. and 108.2 grams (0.5 mol.) of 4-chloro-benzophenone was added thereto with stirring. Due to heat liberated by the reaction which ensued, the reaction temperature quickly rose to 160° C. Stirring was continued and the mixture was maintained at the last mentioned temperature for 0.5 hour. To the mixture a solution of 0.5 mol. of sodium anilide in 0.75 mol. of excess aniline was added with stirring. Stirring was continued and the mixture was heated to a temperature between 180° and 200° C. for a period of about 1.5 hours. The reaction mixture was then cooled to about 80° C., diluted with 400 cubic centimeters of chlorobenzene, and washed thoroughly with water. All water, unreacted aniline and alpha-naphthylamine were distilled from the reaction product. There remained 153 grams of residual product which solidified, upon cooling, to a glassy mass. The product has probably the formula

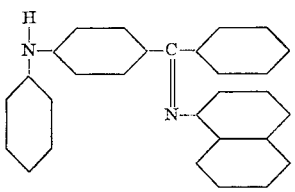

When powdered, the product was olive in color and has a fusion point of about 53° C.

*Example 2*

217 grams (1.0 mol.) of 4-chloro-benzophenone was stirred and heated with 1.0 mol. of sodium anilide in the presence of excess aniline at about 110° C. for a period of about 1 hour to form 4-chloro-benzophenone-anil. The reacted mixture was diluted with chlorobenzene and washed with water. All water, chlorobenzene, aniline, and unreacted 4-chloro-benzophenone were then distilled from the reaction product. As a residue from the distillation there was obtained 253.2 grams, or 87 per cent of the theoretical yield, of 4-chloro-benzophenone-anil.

The sodium salt of beta-naphthylamine was prepared by stirring and heating a mixture of 11.5 grams (0.5 mol.) of sodium, 179 grams (1.25 mols) of beta-naphthylamine, and 0.2 gram of cuprous oxide in a hydrogen atmosphere to a temperature between 200° and 220° C. until the sodium was completely dissolved. To the mixture was added 145.7 grams (0.5 mol.) of the 4-chloro-benzophenone-anil. Stirring was continued and the mixture was maintained at a temperature between 200° and 220° C. for about 1 hour. The reaction product was then separated through procedure similar to that described in Example 1. Thereby there was obtained 171.5 grams of 4-beta-naphthylamino-benzophenone-anil. The solidified product consisted of a glass-like mass which, when powdered, was yellowish-olive in color and had a fusion point of approximately 115–117° C. The product has probably the formula

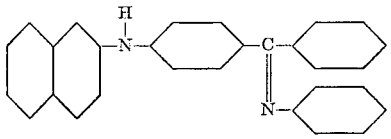

The principle of our invention may be practiced in ways other than those heretofore described. Instead of the specific halogenated aromatic ketones which were employed as reactants in the foregoing table and examples other halogenated aromatic ketones such as 4,4'-dichloro-dibiphenyl ketone, 4,4'-dichloro-benzophenone, 2-chloro-phenyl-naphthyl ketone, 4-bromo-acetophenone, 2-chloro-phenyl-ethyl-ketone, 4-chloro-phenyl-benzyl-ketone, 4-chloro-phenyl- phenylethyl- ketone, etc., may be employed as reactants for the preparation of arylamino-ketone-imides according to the present method. The reactions herein disclosed are general to all halo-aromatic-ketones which do not contain highly reactive substituent groups, i. e. nitro group, hydroxy group, acid group, etc. which would react with the metal amide.

Furthermore, we may employ an alkali metal, calcium, or magnesium salt of any primary aromatic amine, e. g. 2-amino-anthracene, 2-amino-diphenyl, etc. as a reactant in forming an arylamino-ketone-imide according to our method. The only restriction on the kind of primary aromatic amine which may be used is that it must be capable of reacting with an alkali metal, calcium, or magnesium to form the necessary metal amide as a reactant.

Each of the principal reactions herein disclosed may be carried out under either atmospheric or higher pressures. Ordinarily the condensation reactions proceed smoothly under atmospheric pressure, but, in some instances, particularly when reactants of relatively low boiling points are employed, it may be necessary to carry such reactions out under superatmospheric pressure in order to attain the necessary reaction temperature.

The exact temperature at which a given reaction of the class herein described may be carried out is dependent to a large extent upon the properties of the specific reactants which are employed. The reaction temperature ranges which have been stated are those generally applicable in practicing the invention but it is to be understood such reactions may sometimes be carried out at temperatures outside of the exact temperature ranges stated.

The present invention in brief comprises the condensation of a metal salt of a primary aromatic amine either with a halogenated aromatic ketone or with a halogenated aromatic-ketone-imide to form an arylamino-ketone-imide, and the new compounds prepared by such method.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making a compound having the general formula

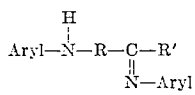

wherein R represents an aromatic group and R' represents a group selected from the class consisting of alkyl, aryl, and aralkyl groups, the step which consists in reacting a nuclear halogenated aromatic ketone with substantially twice its molecular equivalent of a primary aromatic amine salt of a metal selected from the class consisting of the alkali metals, calcium, and magnesium.

2. In a method of making a compound having the general formula

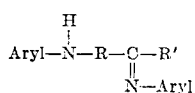

wherein R represents an aromatic group and R' represents a group selected from the class consisting of alkyl, aryl, and aralkyl groups, the step which consists in reacting a nuclear halogenated aromatic ketone with substantially twice its molecular equivalent of an alkali metal salt of a primary aromatic amine, the reaction being completed at a temperature above about 170° C.

3. In a method of making a compound having the general formula

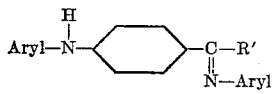

wherein R' represents a group selected from the class consisting of alkyl, aryl, and aralkyl groups, the step which consists in reacting a halogenated aromatic ketone having the general formula

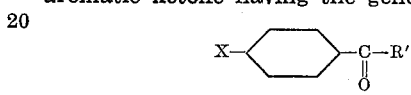

wherein R' represents a group selected from the class consisting of alkyl, aryl, and aralkyl groups, and X represents halogen, with substantially twice its molecular equivalent of an alkali metal salt of a primary aromatic amine.

4. In a method of making a compound having the general formula

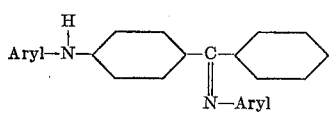

the step which consists in reacting a 4-halo-benzophenone with substantially twice its molecular equivalent of an alkali metal salt of a primary aromatic amine.

5. In a method of making a compound having the general formula

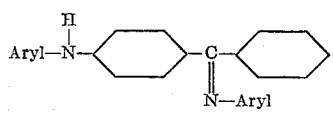

the step which consists in reacting 4-chloro-benzophenone with substantially twice its molecular equivalent of an alkali metal salt of a primary aromatic amine.

6. In a method of making a compound having the general formula

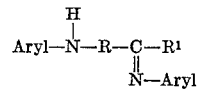

wherein R represents an aromatic group and R' represents a group selected from the class consisting of alkyl, aryl, and aralkyl groups, the step which consists in reacting a halogenated aromatic ketone-imide having the general formula

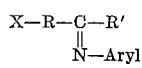

wherein R represents an aromatic group, R' represents a group selected from the class consisting of alkyl, aryl, and aralkyl groups, and X represents a halogen, with a primary aromatic amine salt of a metal selected from the class consisting of the alkali metals, calcium, and magnesium.

7. In a method of making a compound having the general formula

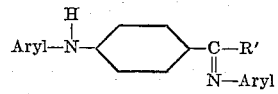

wherein R' represents a group selected from the class consisting of alkyl, aryl, and aralkyl groups, the step which consists in reacting a halogenated ketone-imide having the general formula

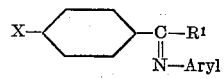

wherein R' represents a group selected from the class consisting of alkyl, aryl, and aralkyl groups, and X represents a halogen, with an alkali metal salt of a primary aromatic amine.

8. In a method of making a compound having the general formula

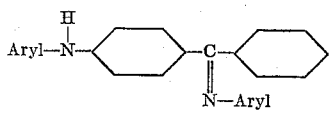

the step which consists in reacting a halogenated benzophenone-imide having the general formula

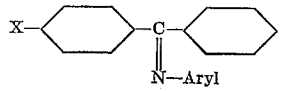

wherein X represents a halogen, with an alkali metal salt of a primary aromatic amine.

9. In a method of making a compound having the general formula

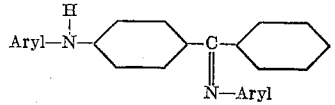

the step which consists in reacting a chlorinated benzophenone-imide having the general formula

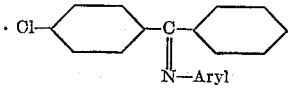

with an alkali metal salt of a primary aromatic amine, the reaction being carried out at a temperature above about 170° C.

10. In a method of making a compound which is represented by the formula

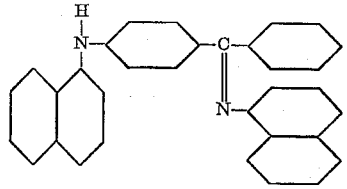

the step which consists in reacting the sodium salt of alpha-naphthylamine with the alpha-naphthylimide of 4-chloro-benzophenon.

11. In a method of making a compound having the formula

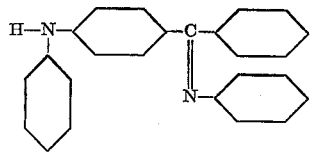

the step which consists in reacting sodium anilide with 4-chloro-benzophenone-anil.

12. A compound having the general formula

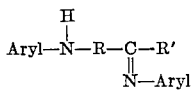

wherein R represents an aromatic group, and R' represents a group selected from the class consisting of alkyl, aryl, and aralkyl groups.

13. Anilino-benzophenone-anil which is represented by the formula

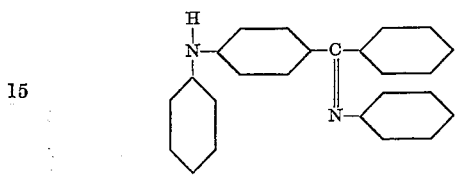

14. α-naphthylamino-benzophenone - α - naphthylimide which is represented by the formula

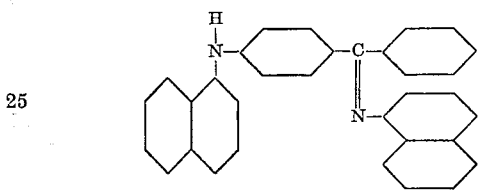

15. β-naphthylamino - benzophenone-β -naphthylimide which is represented by the formula

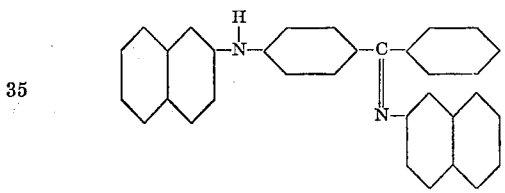

16. The method which comprises reacting a compound having the general formula

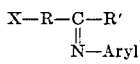

wherein X represents a halogen, R represents an aromatic group, and R' represents a group selected from the class consisting of alkyl, aryl, and aralkyl groups, with a primary aromatic amine salt of a metal selected from the class consisting of the alkali metals, calcium, and magnesium to form a compound having the general formula

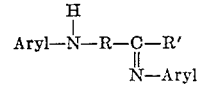

wherein R represents an aromatic group and R' represents a group selected from the class consisting of alkyl, aryl, and aralkyl groups.

17. The method which comprises reacting a nuclear halogenated aromatic ketone with a primary aromatic amine salt of a metal selected from the class consisting of calcium, magnesium, and the alkali metals to form a halogenated ketone-imide having the general formula,

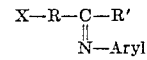

wherein X represents halogen, R represents an aromatic group and R' represents a group selected from the class consisting of alkyl, aryl, and aralkyl groups, and thereafter reacting said imide with a primary aromatic amine salt of a metal selected from the class consisting of calcium, magnesium, and the alkali metals to form a compound having the general formula,

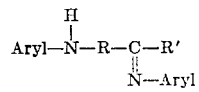

wherein R represents an aromatic group and R' represents a group selected from the class consisting of alkyl, aryl, and aralkyl groups.

18. The method which comprises reacting a nuclear halogenated aromatic ketone with approximately its molecular equivalent of a metal salt of a primary aromatic amine to form the corresponding halogenated aromatic ketone-imide and thereafter reacting the latter with a metal salt of a different primary aromatic amine to form an arylamino aromatic ketone-imide, each of said amine salts being a salt of a metal selected from the class consisting of calcium, magnesium, and the alkali metals.

EDGAR C. BRITTON.
LYMAN HEINDEL.
FRED BRYNER.